United States Patent [19]

Mullins

[11] Patent Number: 5,213,193
[45] Date of Patent: May 25, 1993

[54] DUAL STREAM BOOK PIVOT MACHINE

[75] Inventor: Scott Mullins, Lee's Summit, Mo.

[73] Assignee: Unity School of Christianity, Unity Village, Mo.

[21] Appl. No.: 877,766

[22] Filed: May 4, 1992

[51] Int. Cl.$^5$ .............................................. B65G 47/24
[52] U.S. Cl. .................... 198/416; 198/626.5; 198/636
[58] Field of Search ................... 198/416, 626.1, 626.5, 198/636

[56] References Cited

U.S. PATENT DOCUMENTS

| | | | |
|---|---|---|---|
| 1,290,862 | 1/1919 | Adderson et al. .................. | 198/416 |
| 2,586,523 | 2/1952 | Dudley, Jr. ........................... | 198/416 |
| 2,841,269 | 7/1958 | Jenney et al. ....................... | 198/416 X |
| 3,044,600 | 7/1962 | Miller, Jr. ............................ | 198/416 |
| 3,269,513 | 8/1966 | Del Rosso ........................... | 198/416 |
| 4,670,081 | 6/1987 | Takahashi et al. ................. | 198/416 X |

FOREIGN PATENT DOCUMENTS 0037021  2/1988  Japan .................... 198/416

Primary Examiner—D. Glenn Dayoan
Attorney, Agent, or Firm—Hovey, Williams, Timmons & Collins

[57] ABSTRACT

A dual-stream book pivot machine is provided which turns books moved therealong 90° to present a labeling area thereon in proper orientation and includes belts for moving the books downstream and a stop positioned in the path of the books moving therealong. Two parallel streams are preferably provided so that books, which have their greatest surface resting in engagement with the belts, can move in side-by-side relationship, each being turned to avoid interference with the books in the adjacent stream. The stops are positioned at one side of the belts for moving the books, the stop thus creating a point about which the books pivot and move laterally at least the width of the stop. The stop is elongated to present a guide preventing spinning of the pivoted books and thereby retaining the books in the proper orientation for handling by machines located downstream therefrom.

19 Claims, 7 Drawing Sheets

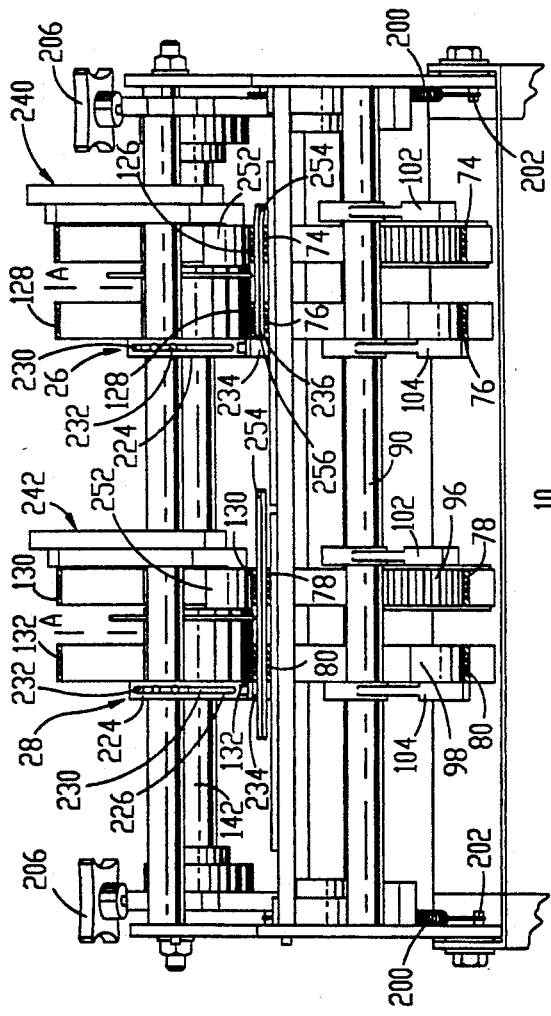
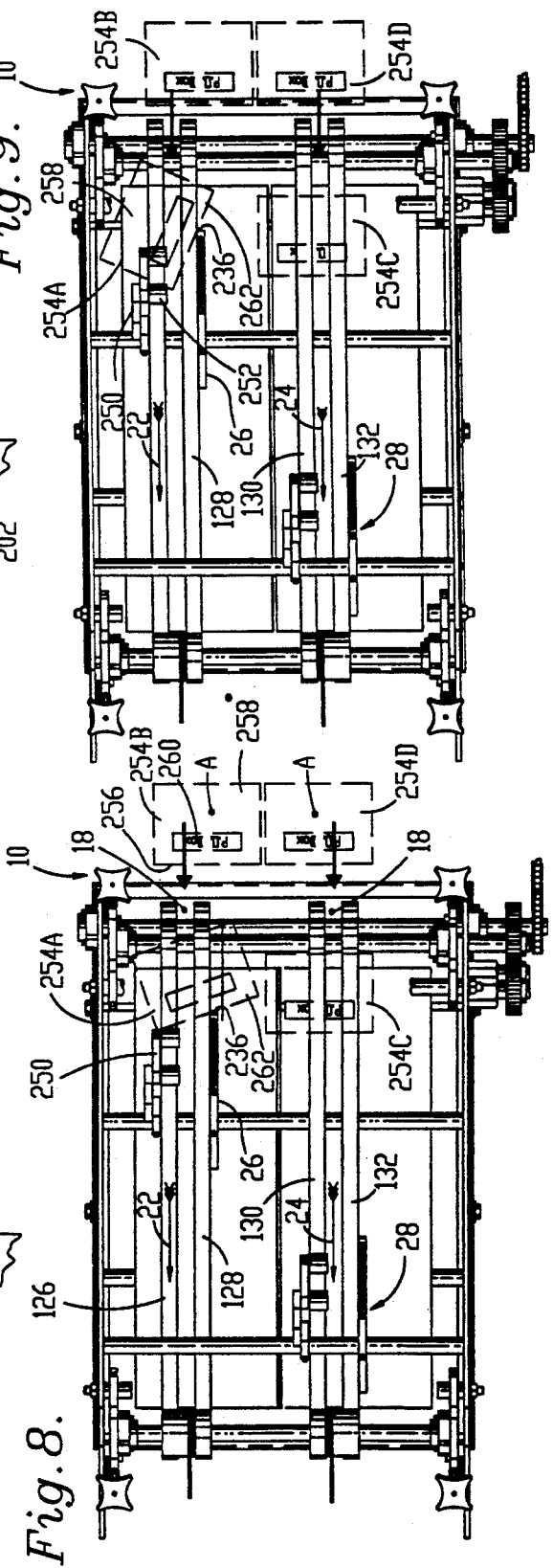

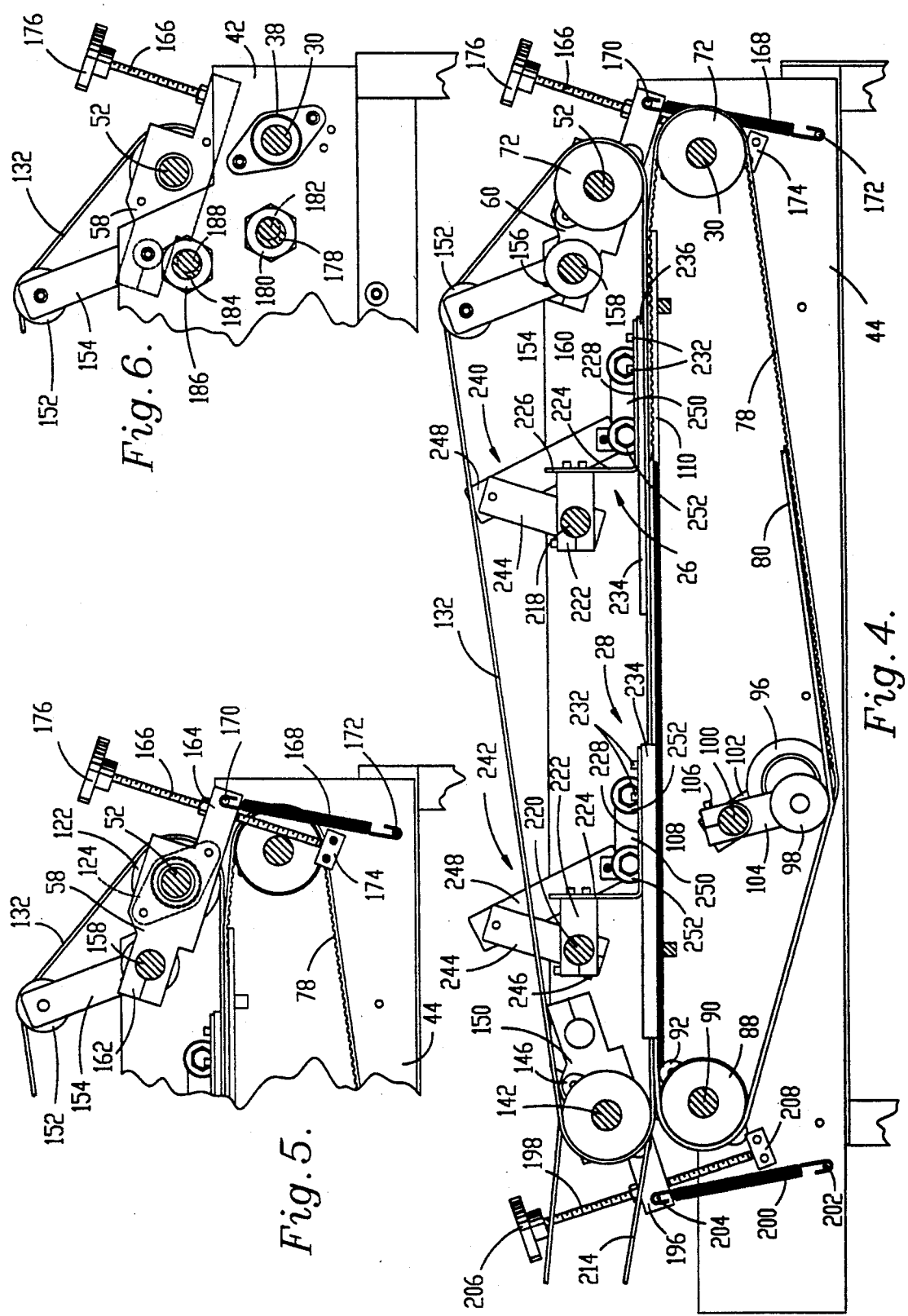

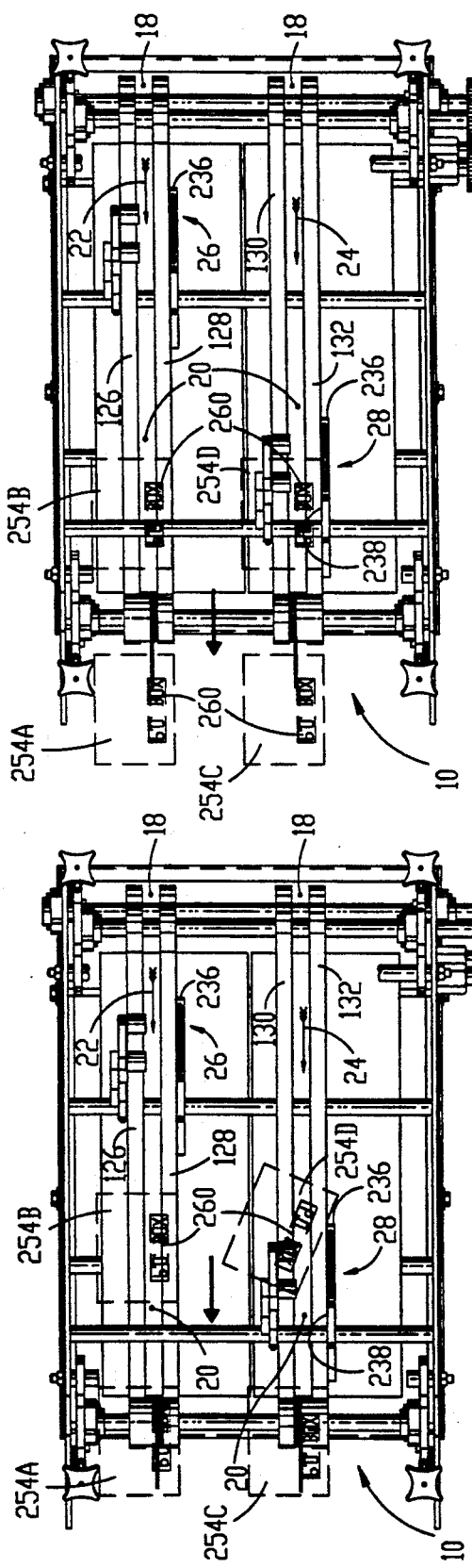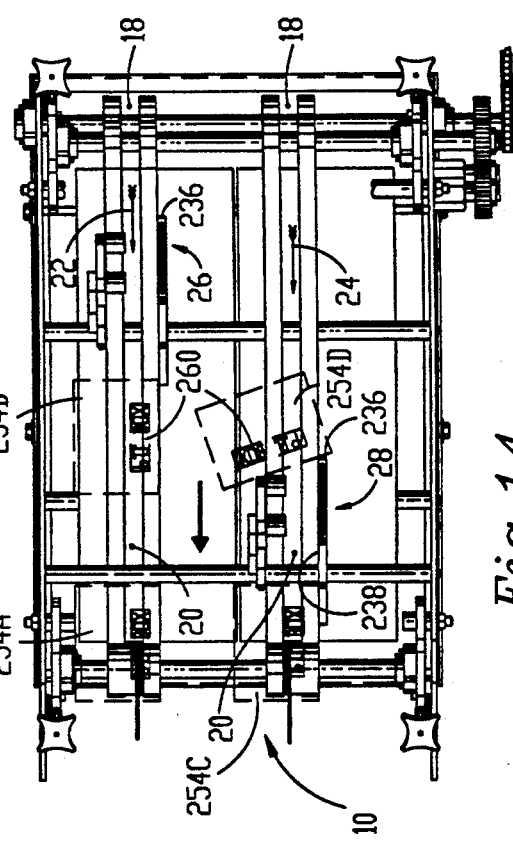

DUAL STREAM BOOK PIVOT MACHINE

BACKGROUND OF THE INVENTION

1. Field of the Invention

This invention broadly concerns a machine for turning books or booklets conveyed along a path whereby they are reoriented at an angle from their initial position. More particularly, this invention concerns a machine for handling two streams of closely adjacent booklets and turning the booklets in each stream for labelling and collating at a downstream location.

2. Description of the Prior Art

Small books such as booklets and pamphlets have traditionally been created by collating a number of printed pages and then labelling an area on the exterior of the booklet to minimize mailing costs. These booklets have been printed so that two booklets are printed simultaneously and after the sheets have been collated, a center portion is cut and removed to separate the two booklets. The booklets are typically folded to create a spine along which staples or the like are used as bindings. Heretofore, the address labelling area has been on one side of the cover and oriented with the writing of the address labels extending perpendicular to the spine.

The machines for handling these booklets have been set up to handle two streams of booklets with the labels in this orientation. That is to say, the stapling and cutting machines have all been set up to receive a booklet with this orientation, the label applicators have been set up to apply a label received from the cutting machine with the major axis of the label oriented in a direction transverse to the spine, and the stacking and sorting areas have been set up so that the booklets are "shingled" and only partially cover one another, leaving the labelling area of each booklet visible. The handlers at the sorting machine could thus easily see whether a booklet was in the proper sequence for bulk mailing.

Unfortunately, a change in postal regulations now requires that the label be positioned along the spine, rather than perpendicular thereto in order to take advantage of these reduced postal rates. While this would seem to be a minor difficulty, all of the other machinery necessary to bind, cut, stack, label and sort a high production rate of booklets has been developed with a view toward having the labels positioned transversely to rather than aligned with the spine. If the booklets were to continue to be handled in the previous manner without alteration, the labels would be misplaced, or the labels obscured during sorting. To fail to change the label orientation would result in loss of advantageous bulk postage rates presenting an unacceptable cost to the publisher.

To replace all the machinery in a facility to handle the repositioned label would also represent an unacceptable cost. Thus, a real need has developed to solve the problem of handling books or booklets without a complete re-engineering of the labelling and sorting layout.

SUMMARY OF THE INVENTION

The present invention presents an excellent solution to this problem by providing a small machine which can turn two streams of side-by-side booklets without disrupting the plant layout and is fully compatible with existing machinery. That is to say, the dual stream book pivot machine hereof is efficient, requires a minimum of power to operate, makes only a small footprint on the plant floor, and most importantly, enables the existing machinery to be used without substantial modification. The machine hereof thus presents an economical solution to an otherwise potentially very expensive problem.

The dual stream book pivot machine hereof receives the booklets from a busting machine that cuts and thus separates the collated and stapled sheets into two separate booklets which have their surfaces with the largest area in engagement with the belts. The booklets are moved along in the desired direction separated by only a very small distance. As the booklets move downstream on the book pivot machine hereof, they are separately turned 90° by engaging a stop positioned in each stream. The stops engage a corner of each booklet and cause the booklet to turn 90° and move laterally a desired distance. Thus, as the first book turns, it moves laterally a sufficient distance to permit the book beside it in the second stream to engage its respective stop located slightly respectively downstream from the first stop and turn without any interference. As the two side-by-side booklets leave the book pivot machine, each has been pivoted to receive a label from a label applying machine located downstream therefrom.

The dual stream book pivot machine hereof includes a stop positioned in the path of the books or booklets and means for moving the books downstream. Preferably the moving means comprises an upper belt and a lower belt for conveying the booklets and defining a book movement stream. The belts are positioned to hold the booklets therebetween and thus ensure that the booklets continue to move downstream as their respective front edges are engaged by the stop. The belts are driven by pulleys which are secured to shafts which can be adjusted for tension according to the thickness of the booklets passing therebetween. Preferably two parallel belts are positioned above each book i superposed relationship to two belts below the booklet, all moving in unison at the same speed. The stops are preferably elongated to present a guide and thus not only engage the booklet but also establish the booklet's new alignment and prevent the booklet from spinning. As each booklet engages the stop, it not only pivots but moves transversely to the direction of travel according to the width of the stop because the belts continue to move downstream, carrying the booklet with them. The belts and stop thus cooperate to create a moment about the stop and when the booklet has pivoted sufficiently to disengage from the stop, the booklet has been turned and is aligned by the downstream portion of the elongated stop.

Preferably, the stop for one of the streams is positioned relatively upstream of the other stop. The upstream stop in the first stream is position relatively inboard to the belts and thus causes the booklets carried on the belts thereof to pivot away from and be displaced laterally from the second stream. This provides a clearance whereby the booklets in the second stream may freely pivot in the same direction without engaging or interfering with the booklets carried along the first stream. By pivoting the booklets in the same direction, the existing labelling machinery may be used with the labels all oriented in a common direction for reading by the sorters at a downstream location.

BRIEF DESCRIPTION OF THE DRAWINGS

FIG. 3 is an enlarged vertical cross sectional view taken along line 3—3 of FIG. 1;

FIG. 4 is a vertical cross-sectional view taken along line 4—4 of FIG. 2;

FIG. 5 is a fragmentary vertical cross-sectional view taken along line 5—5 of FIG. 2;

FIG. 6 is a fragmentary vertical cross-sectional view taken along line 6—6 of FIG. 2;

FIG. 8 is a top plan view showing the invention hereof with books moving downstream in the direction indicated by the arrow;

FIG. 9 is a top plan view showing the invention hereof similar to FIG. 8 with the books moving further downstream in the direction indicated by the arrow;

FIG. 14 is a top plan view similar to FIG. 13 showing the books farther downstream with the lead book in the second stream fully pivoted and the trailing book in the second stream beginning to pivot;

FIG. 15 is a top plan view similar to FIG. 14 showing the books farther downstream with the trail book of the second stream pivoting; and FIG. 16 is a top plan view similar to FIG. 15 showing all the books in a final, fully pivoted orientation.

DESCRIPTION OF THE PREFERRED EMBODIMENT

Figure 1:
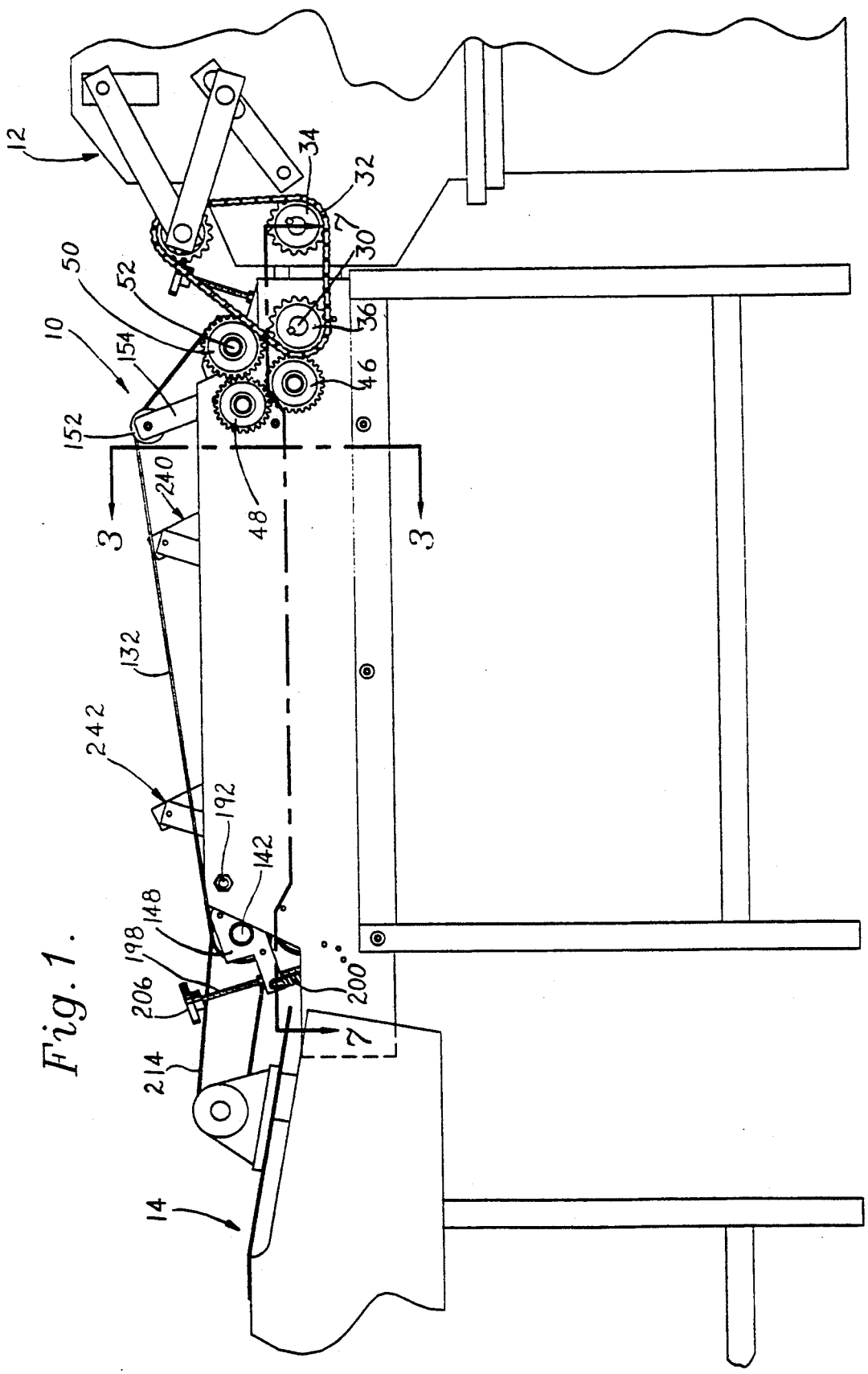
FIG. 1 is a left side elevational view of the dual stream book pivot machine hereof, showing a fragmentary portion of the busting machine from which it receives the books and a fragmentary portion of the separation machine for subsequent feeding to a labelling machine.

Referring now to the drawing, a dual-stream book pivot machine 10 in accordance with the present invention is shown in FIG. 1 oriented to receive books from a busting machine 12 which cuts and removes a dividing strip from between the two books, and deliver the reoriented books to a spacing machine 14 which presents the books to a labeller located downstream therefrom. One such busting machine 12 is a Model 2300XL from McCain Manufacturing of Chicago, Ill.

Figure 2:
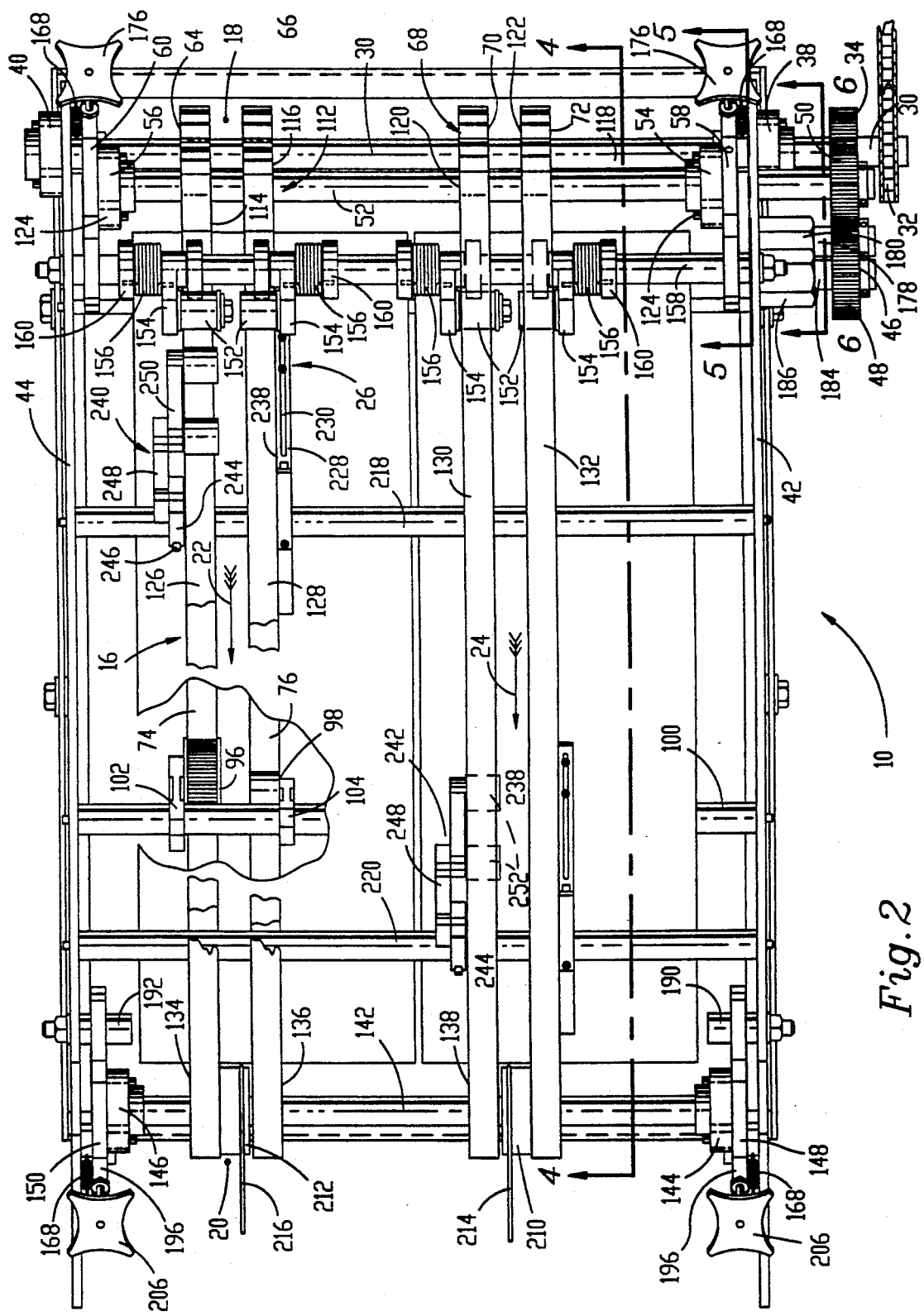
FIG. 2 is an enlarged top plan view of the present invention, with a portion of the table and belts thereabove broken away to show the return path of the lower belt of one stream.

As shown in FIG. 2, the book pivot machine 10 broadly includes advancing means 16 for moving the books downstream from a receiving location 18 to a delivery location 20. Advancing means 16 in the preferred embodiment defines a first stream 22, and a second stream 24 positioned adjacent thereto, both first stream 22 and second stream 24 being substantially parallel and moving in the same direction. Abutments 26 and 28 are respectively positioned in each of the streams 22 and 24 to engage books moving there along and effect pivoting thereof about an axis A which, as shown herein, is substantially vertical and perpendicular to the cover of the books.

In greater detail, advancing means 16 includes drive shaft 30 which extends transversely across the width of the machine 10 and is rotated by chain 32 driven by gear 34 on busting machine 12. Chain 32 drives sprocket 36 which in turn rotates shaft 30 in a generally counterclockwise direction as viewed in FIG. 1. Shaft 30 is journaled by bearings 38 and 40 mounted to the side walls 42 and 44, respectively, of machine 10. Drive sprocket 36 in turn rotates lower transfer gear 46 which in turn drives upper transfer gear 48 adjacent side wall 32. Upper transfer gear 48 drives gear 50 which is secured to shaft 52 and rotates in a counterclockwise direction as viewed in FIG. 1. Shaft 52 is journaled within bearings 54 and 56 mounted on tensioner arms 58 and 60, respectively.

Figure 7:
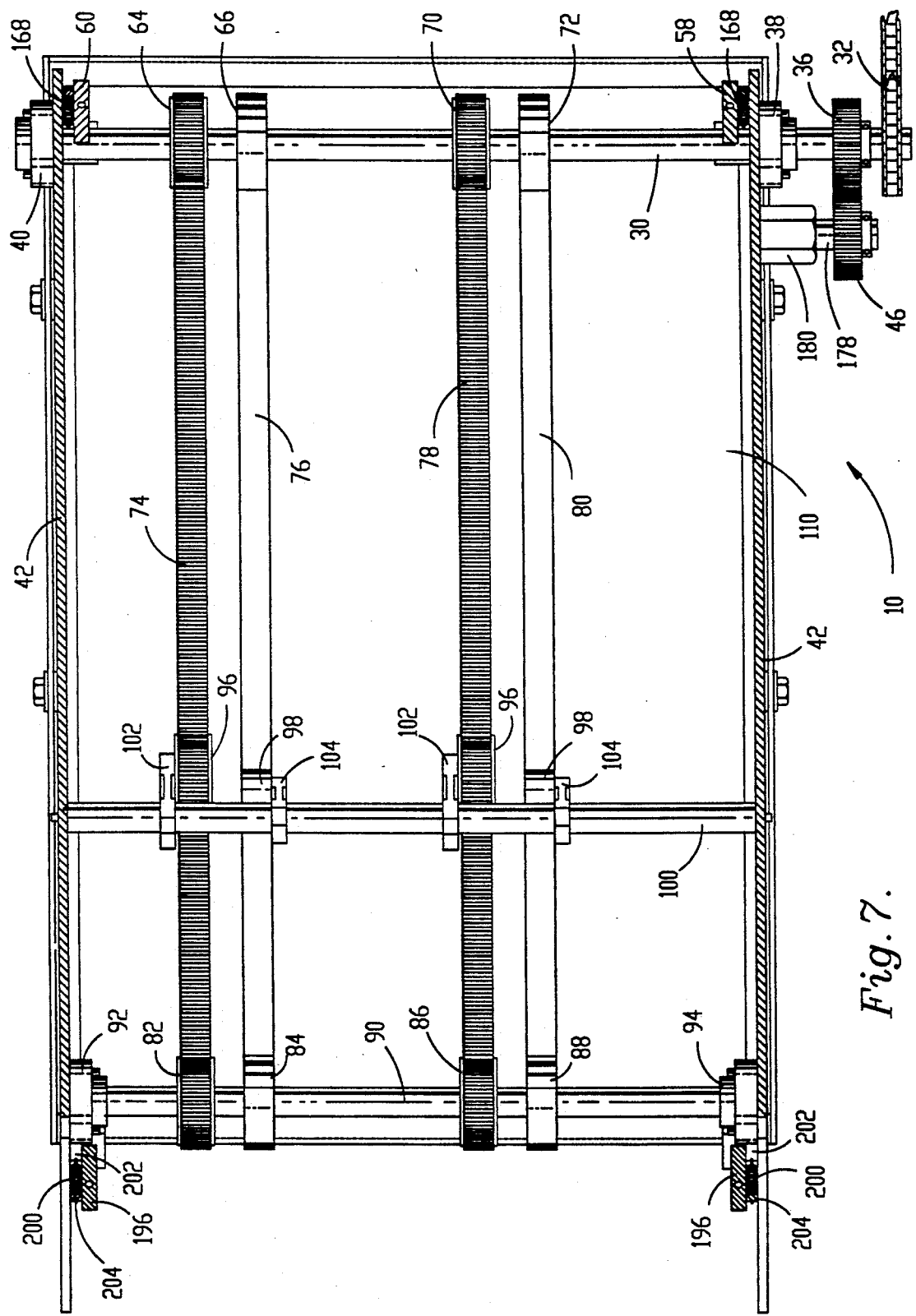
FIG. 7 is a horizontal cross-sectional view taken along line 7—7 of FIG. 1.

Shaft 30 is connected to and drives first upstream pair 62 of belt pulleys 64 and 66, as well as second upstream pair 68 of belt pulleys 70 and 72, which rotate with shaft 30. Correspondingly, pulley 64 drives toothed belt 74 and pulley 66 drives belt 76, while pulley 70 drives toothed belt 78 and pulley 72 drives belt 80. Belts 74 and 76, in part, define essentially linear first stream 22, while belts 78 and 80, in part, define second stream 24. Toothed belt 74 wraps around lower downstream pulley 82, belt 76 wraps around lower downstream pulley 84, toothed belt 78 wraps around lower downstream pulley 86 and belt 80 wraps around lower downstream pulley 88, each of the lower downstream pulleys 82, 84, 86 and 88 being fixed to lower downstream shaft 90 for rotation therewith. As may be seen in FIG. 7, lower downstream shaft 90 is carried by and rotates in bearings 92 and 94. Each of the toothed belts 74 and 78 are maintained in tension by a respective toothed idler pulley 96 while each of belts 76 and 80 are maintained in tension by lower idler pulley 98. Pulleys 96 and 98 are affixed to idler carrying shaft 100 by respective legs 102 and 104. Arms 102 and 104 are adjustably fixed to idler carrying shaft 100 by bolts 106 threaded into clamps 108 carried by the respective arm 102 and 104. Idler carrying shaft 100 extends transversely across book pivot machine 10 and is fixed to side walls 42 and 44. Table 110 is positioned immediately below belts 74, 76, 78 and 80 and extends transversely across book pivot machine 10.

Shaft 52 is connected to and drives first upper upstream pair 112 of upper belt pulleys 114 and 116, as well as second upper upstream pair 118 of upper belt pulleys 120 and 122, which rotate with shaft 52. Shaft 52 is carried by bearings 124 mounted on respective tensioner arms 58 and 60. Pulley 114 drives upper belt 126 while pulley 116 drives upper belt 128, and pulley 120 drives upper belt 130 while pulley 122 drives upper belt 132. Upper belt 126 continues downstream above and in superposed relationship to belt 74 and wraps around upper downstream pulley 134, upper belt 128 continues downstream above and in superposed relationship to belt 76 and wraps around upper downstream pulley 136. Belts 126 and 128, together with belts 74 and 76 define first stream 22. Belt 130 continues downstream above and in superposed relationship to belt 78 and wraps around upper downstream pulley 138, and belt 132 continues downstream above and in superposed relationship to belt 80 and wraps around upper downstream pulley 140. Upper downstream pulleys 134, 136, 138 and 140 are fixed to and rotate with upper downstream shaft 142. Upper downstream shaft 142 is carried by and rotates within bearings 144 and 146, which are mounted to downstream tensioning arms 148 and 150, respectively. Each of the upper belts 126, 128, 130 and 132 are maintained in tension by a respective upper idler pulley 152 carried by a corresponding tensioning beam 154. Each tensioning beam 154 is biased upwardly toward its respective belt 126, 128, 130 and 132 by a torsion spring 156. The tensioning beam 154 and the torsion springs 156 are carried by tensioning shaft 158 extending transversely across book pivot machine 10 and secured to tensioner arms 58 and 60 at the respective ends thereof. While tensioning beam 154 is free to pivot on tensioning shaft 158, torsion springs 156 are prevented from rotation by keepers 160 fixed to tensioner shaft 158 and into which one end of the torsion spring 156 is inserted, the other end of the torsion spring 156 being inserted into the corresponding tensioning beam 154.

Tensioner arms 58 and 60 are mounted for limiting pivoting about tensioning shaft 158 as shown in FIGS. 5 and 6. Tensioning shaft 158 is clamped in jaws 162 at one end of each tensioner arm 58 and 60. At the end 164 of tensioner arms 58 and 60 opposite jaws 162 and tensioner shaft 158, a thickness adjustment screw 166 is threadably carried by the respective tensioner arm 58 and 60. Thickness adjustment screw 166 may be rotated to adjust end 164 up or down and thus move shaft 52 up or down therewith. End 164 is biased downwardly by spring 168 and held by pin 170 on tensioner arm 58 and pin 172 mounted on the respective side wall 42 or 44. The downward travel of end 164 of tensioner arm 58 or 60 is limited by the engagement of adjustment screw 166 with block 174 affixed to respective side wall 42 or 44. Thickness adjustment screw 166 may be moved upwardly or downwardly relative to the respective tensioner arm 58 or 60 by turning knob 176 affixed at the upper end of the adjustment screw 166.

Lower transfer gear 46 is mounted on rod 178 which extends outboard of side wall 42 and is held securely thereagainst by nut 180. Rod 178 presents an eccentrically mounted pin 182, shown in phantom in FIG. 6, which extends through side wall 42. The pin 182 is threaded for receiving thereon a nut whereby the rod 178 may be adjusted as tensioner arms 58, 60 move shaft 52 up and down according to the thickness of the book to be handled. Similarly, upper transfer gear 48 is mounted on rod 184 which is held in position by nut 186 threaded thereon. Rod 184 presents an eccentrically mounted pin 188 extending through side wall 42 which is secured by a corresponding nut threaded thereon. By loosening the nuts inboard of side wall 42, nuts 180 and 186 may be rotated to adjust the location of rods 178 and 184 and thus gears 46 and 48 to prevent binding as shaft 52 is adjusted. The inboard nuts and eccentric pins have been omitted from FIG. 5 for clarity in revealing the other details of the structure of the book pivot machine 10.

Downstream tensioning arms 148 and 150 are respectively pivotally mounted to side walls 42 and 44 by threaded dowels 190 and 192. Each dowel is positioned at the respective upstream end of its corresponding tensioning arm and held by the upstream end of the tensioning arm by jaws 194 thereon. Positioned relatively downstream to dowel 190 or 192 are bearings 144 and 146, respectively, which carry upper downstream shaft 142 therein. At the downstream end 196 of the downstream tensioning arms 148, 150, downstream adjustment screw 198 is threadably carried by the respective tensioning arm 148, 150 and for moving the downstream end 196, and thus shaft 142 upwardly or downwardly as the respective tensioning arms 148, 150 pivot about their respective dowels 190, 192. The downstream end 196 is biased downwardly by spring 200. The spring 200 is maintained in tension by pin 202 extending inwardly from each respective side wall 42, 44 and by pin 204 at the upper end of the spring, pin 204 extending inwardly from downstream end 196 of each respective tensioning arm 148, 150. Knob 206 is provided for each downstream adjustment screw 198 at the upper end thereof, with a block 208 positioned for engaging the lowermost portion of the adjustment screw 198. Shaft 142 also carries drive pulleys 210 and 212 for driving bands 214 and 216, respectively to synchronize the operation of spacing machine 14 with book pivot machine 10.

Crossbars 218 and 220 extend transversely across the width of book pivot machine 10 between side walls 42 and 44. Crossbar 218 is located relatively upstream compared to crossbar 220 and carries abutment 26 for engaging books travelling along first stream 22. Similarly, crossbar 220 is positioned downstream relatively to crossbar 218 and carries abutment 28 for engagement of books moving along second stream 24.

Each abutment 26, 28 is similarly configured and like numbers will be used to refer to components common to each. A clamp 222 secures each abutment 26, 28 to its respective crossbar 218, 220. Each clamp 222 extends upstream relative to its respective crossbar and mounts downwardly and forwardly extending mounting angle 224 thereto. Each mounting angle 224 includes a generally downwardly extending leg 226 and a forwardly extending leg 228. Both the forwardly extending leg 228 and the downwardly extending leg include a slot 230 therein adapted to receive allen bolts 232 therethrough. The allen bolts extending through the slot 230 of downward leg 226 are threaded into clamp 222 while the allen bolts extending through the slot 230 of the forwardly extending leg 228 are threaded into tapped holes in elongated ribs 234. Each rib 234 presents a blunt engagement surface 236 at the upstream end thereof and an elongated trailing edge 238 which acts as a guide for aligning books after the latter has pivoted. Ribs 234 may be moved upstream or downstream relative to crossbars 218 or 220 by loosening the allen bolts 232 and shifting the ribs 234 along their respective slot 230.

Machine 10 also includes press roller assemblies 240 and 242 respectively mounted on crossbars 218 and 220. Press roller assembly 240 is positioned laterally opposite abutment 26 while press roller assembly 242 is positioned laterally opposite abutment 28. Each press roller assembly 240, 242 is commonly configured and includes beam 244 adjustably secured to its respective crossbar 218, 220 by an allen bolt 246 threaded into jaws therein, a depending leg 248 pivotally mounted to beam 244 and a press foot 250 connected to the lower end of leg 248. Each foot mounts a pair of tandemly mounted rollers 252 for maintaining contact between a book and the corresponding belt 74, 78.

The operation of the book pivot machine 10 hereof is best illustrated by the sequence of drawings including FIGS. 8 through 16. The book pivot machine 10 hereof is especially designed to handle books 254 in booklet form bound along the spine 256 thereof by a staple or staples securing the pages of the book together. Each book presents a cover 258 wherein a label receiving area 260 is presented. As shown in FIGS. 8 through 16, this label receiving area 260 is conventionally elongated whereby the printing of the label will appear so as to be read from left to right as the book is positioned with the major axis thereof extending horizontally and the spine 256 at the uppermost position thereof. As used herein, the indicia "P.O. Box" as used in FIG. 8 is intended to assist reader in understanding the orientation of the label to be placed on the book at a downstream location. However, as the books 254 enter the receiving area, no such label is yet applied. It may also be understood, when viewing FIGS. 8 through 16, that the book is to be pivoted about an axis A extending substantially perpendicular to the cover 258, with the essentially flat cover extending in an essentially horizontal plane as shown in FIG. 3.

In FIG. 8, books 254A and 254B are shown moving into and through the receiving location 18 of first stream 22 and books 254C and 254D, which are substantially identical to books 254A and 254B, are moving into receiving location 18 of the second stream 24. Book 254A is shown being carried between belts 74 and 76 positioned therebeneath and belts 126 and 128 positioned thereabove, better seen in FIG. 3, while book 254C is shown being carried between belts 78 and 80 positioned therebeneath and belts 130 and 132 positioned thereabove. The spacing between books 254B and 254D, prior to entry into the book pivot machine 10 hereof, may be varied, but it would not be uncommon for such distance to be about 5/16 inch. Books 254 as shown moving through and pivoting in the preferred embodiment of book pivot machine 10, are conventionally of a thickness from 0.035 to 0.5 inch, and have a maximum width of about 5½ inch and a maximum length of 8⅜ inch. It may be appreciated that other configurations of the invention hereof could be developed to handle books 254 having different dimensions.

As book 254A moves downstream along first stream 22, the spine 256 thereof engages blunt engagement surface 236 of abutment 26. The blunt engagement surface 236 is offset to the midpoint of the spine 256, and also offset to belts 126 and 128. As a result, belts 126 and 128 continue to move the book 254A downstream causing the latter to pivot about the blunt engagement surface 236 as shown in FIG. 8. As the book 254A begins to pivot about its axis A, there is sufficient space between book 254A and book 254C so that inboard corner 262A does not touch and thereby disturb book 254C as it moves downstream along stream 24.

Turning to FIG. 9, books 254A, 254B, 254C and 254D continue to move downstream. Book 254A continues its pivoting action about blunt engagement surface 236 of abutment 26. It should be noted that the rollers 252 of the press foot 250 serve to maintain engagement between belt 126 and the cover 258 of the book 254A, to ensure that book 254A continues to move downstream carried between belts 74 and 126 and to inhibit any slippage between the book 254A and the belts 74 and 126. The thickness of rib 234 also serves to move book 254A slightly laterally relative to stream 22 as the book 254 pivots. It should be noted that in FIG. 9, book 254C has not yet begun its pivoting movement.

Figure 10:
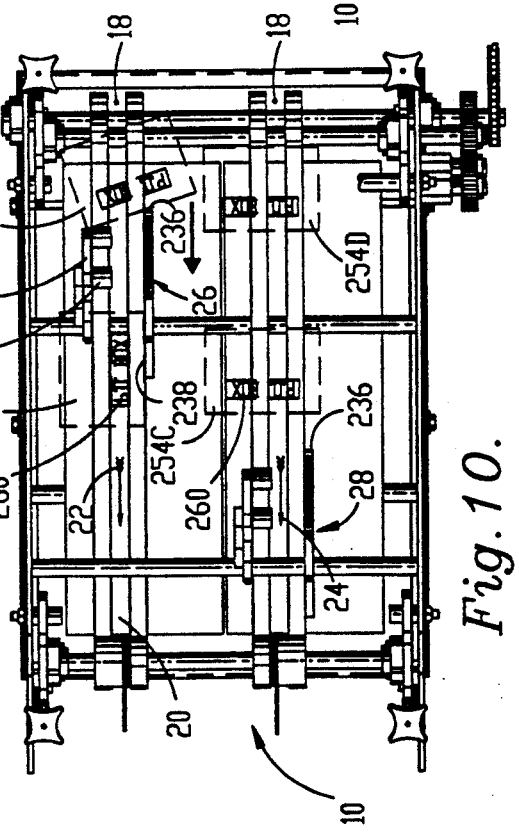
FIG. 10 is a top plan view similar to FIG. 9 showing the books advanced farther downstream with the book in the first stream fully pivoted.

Referring now to FIG. 10, book 254A has completed its 90° pivot and has moved further downstream along stream 22. The spine 256 and label receiving area 260 of book 254A have now been reoriented so that instead of being transverse to the direction of travel, they are substantially aligned therewith. In this regard, elongated trailing edge 238 serves as a guide to align spine 256 in an upstream to downstream direction and also maintains book 254A in the proper orientation to prevent it from spinning as it is engaged by blunt engagement surface 236. It may be seen that while books 254B and 254D have moved into receiving area 18 along each of the respective streams 22 and 24, only book 254B has begun pivoting about the blunt engagement surface 236 of its respective abutment. This ensures that as books 254C and 254D pivot toward the inboard direction of machine 10 with reference to stream 24, books 254A and 254B will already have pivoted and moved slightly laterally to avoid any interference.

Figure 11:
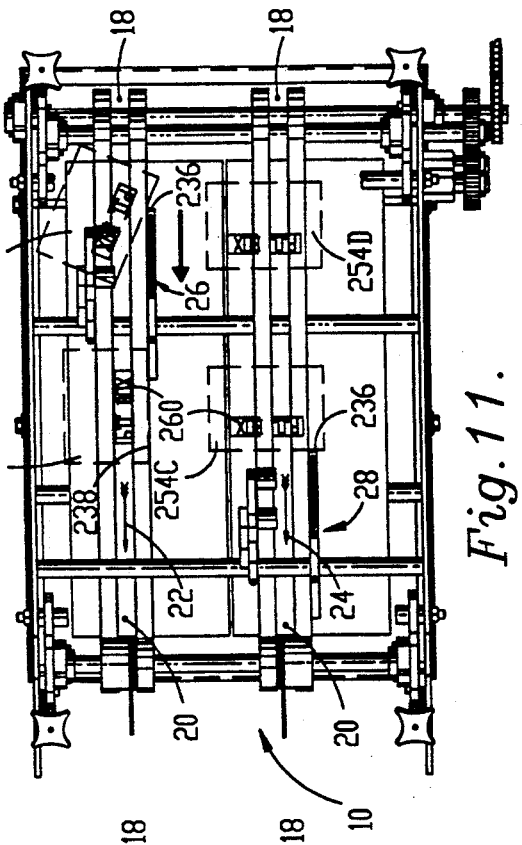
FIG. 11 is a top plan view similar to FIG. 10 showing the books advanced farther downstream with the lead book in the second stream engaging the stop thereof.

In FIG. 11, book 254A continues downstream maintaining its newly oriented position while laterally adjacent book 254C contacts on engagement surface 236 of abutment 28. Book 254B also continues pivoting about blunt engagement surface 236 of abutment 26, such pivoting again being caused by the moment created about blunt engagement surface 236 by the downstream movement of those portions of the book 254B engaged with belts 126 and 128 above and belts 74 and 76 therebeneath.

Figure 13:
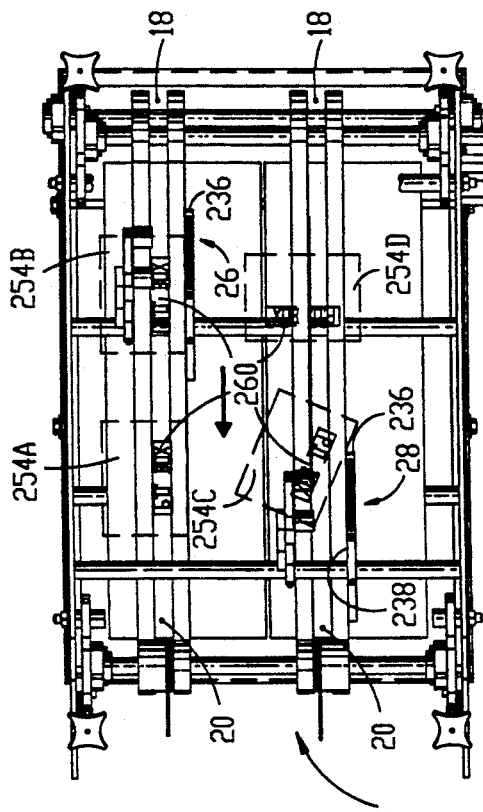
FIG. 13 is a top plan view similar to FIG. 12 showing the books farther downstream with the lead book of the second stream nearly finishing its pivot and the trail book of the first stream retained in orientation by the elongated stop.
Figure 12:
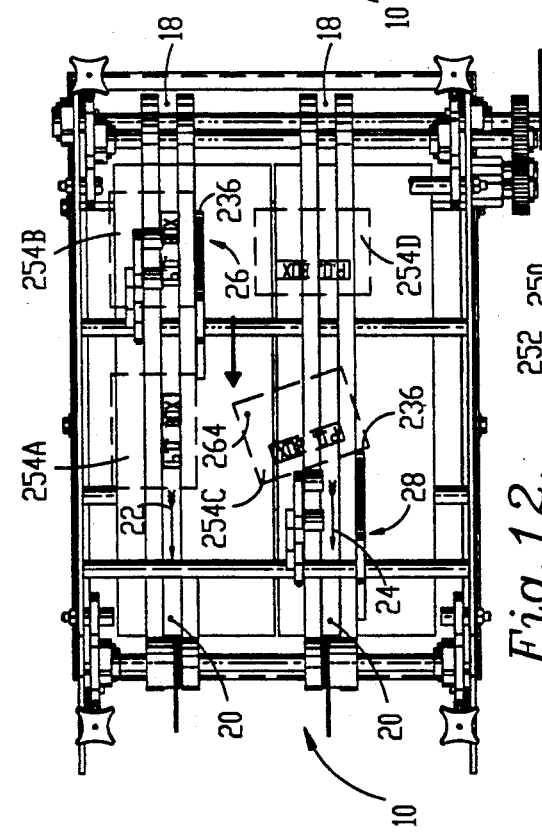
FIG. 12 is a top plan view similar to FIG. 11 showing the books advanced farther downstream.

Book 254C is shown beginning to pivot in FIG. 12, and it should be noted that book 254C pivots in the same direction as books 254A and 254B in order to maintain all of the label receiving areas in a common orientation on the same side relative to the book pivot machine 10 so that the books in each stream 22 and 24 may be arranged in a shingled manner after receiving the label in the label receiving area. Book 254A has already pivoted and moved laterally away from book 254C so that the inboard corner 264 of book 254C does not impinge on book 254A. FIG. 13 shows the book 254C continuing to pivot with rollers 252 of press foot 250 maintaining contact between the belts 78 and 130 and the book 254C during the pivoting action. In FIGS. 12 and 13, books 254A and 254B have completed pivoting and rib 234 of abutment 26 has placed them in the proper alignment before the books continue movement downstream to the delivery location 20.

In FIG. 14, book 254C has completed its pivoting movement and together with book 254A has moved to the delivery location 20 where it may be transferred to another machine for further processing such as label application. Because the books 254 typically present a smaller width than length along the spine 256, and because book 254A has been pivoted first and shifted outboard, there is ample lateral clearance between the books 254A and 254C as they move to the delivery location 20. Additionally, book 254D has engaged the abutment 28 and begun its pivoting movement, which continues in FIG. 15. FIG. 16 illustrates books 254B and 254D in the final orientation with the books pivoted 90° about an axis A extending vertically upwardly from the cover 258. It may be understood that only two books have been illustrated as moving along each stream 22 and 24, but that in practice the apparatus of the present invention is capable of continuous operation for handling up to about 26,000 books 254 per hour.

In order to adjust the book pivot machine to accommodate books of a different thickness, the operator turns knobs 176 and 206 to move the respective adjustment screws 166 and 196. Each of the adjustment screws should be turned the same amount to effect the same movement of the shafts 52 and 142 operatively connected thereto. Because shaft 52 is rotated by gear 48, which is in turn driven by gears 48 and 46, adjustment of these transfer gears 48 and 46 must be effected to avoid binding of the gears when the shaft 52 is moved. This is accomplished by turning the respective nuts 180 and 186. Because the pins 182 and 188 are eccentrically mounted with respect to the rods 178 and 184 connected thereto, the relative spacing of the gears may be effected by turning the nuts 180 and 186 to rotate the rods 178 and 184 in an eccentric manner to thereby avoid binding of the gears 46 and 48 mounted thereon.

The book pivot machine 10 hereof permits two closely laterally spaced streams 22 and 24 of books 254 to be turned without interference and with a minimum of moving parts and expense. The machine 10 also takes up very little floor space and is compatible with existing equipment located upstream and downstream therefrom.

I claim:

1. A dual-stream book pivot machine for turning respective first and second books each presenting a normally flat cover about an axis extending substantially perpendicular to the cover, said machine comprising:
   a receiving location for receiving the first and second books in laterally spaced, side-by-side relationship;
   a delivery location located downstream from said receiving location for delivering said first and second books in laterally spaced, side-by-side relationship;
   first advancing means for advancing the first book along a first stream from the receiving location to the delivery location;
   second advancing means for advancing the second book along a second stream oriented substantially parallel and adjacent to said first stream from the receiving location to the delivery location in side-by-side relationship to the first book; and
   first and second abutment means respectively positioned along said first and second streams intermediate said receiving location and said delivery location and off-center relative to each respective stream for engaging the respective books and causing the respective first and second books to pivot about said axis from a first orientation at said receiving location to a second orientation at said delivery location and for increasing the lateral spacing between said books at said delivery location relative to said receiving location.

2. A dual-stream book pivot machine as set forth in claim 1, wherein said first abutment means is positioned upstream relative to said second abutment means whereby said first book advancing along said first stream is pivoted relatively prior to said second book advancing along said second stream.

3. A dual-stream book pivot machine as set forth in claim 1, wherein each of said first and second abutment means includes an elongated rib, each of said ribs presenting an edge extending downstream for aligning a respective one of said first and second books after said books have engaged the respective abutment means.

4. A dual-stream book pivot machine as set forth in claim 1, wherein each of said first and second advancing means includes a first belt and a superposed second belt for holding the book therebetween as the book moves downstream into engagement with said abutment means and then to said delivery location.

5. A dual-stream book pivot machine as set forth in claim 1, wherein each of said advancing means includes a pair of side-by-side belts for carrying the respective book downstream into engagement with said abutment means.

6. A dual-stream book pivot machine as set forth in claim 1, including first and second holding means positioned respectively above said first and second books as said books engage said respective abutment means.

7. A dual-stream book pivot machine as set forth in claim 6, wherein each of said first and second holding means includes at least one roller.

8. A dual-stream book pivot machine as set forth in claim 1, wherein each of said first and second advancing means includes a first pair of side-by-side belts for carrying a respective one of said books and a second, superposed pair of belts for moving said respective one of said books along said stream, including means for synchronizing said first pair of belts with said second pair of belts.

9. A dual-stream book pivot machine as set forth in claim 8, said first pair of belts being separated from said second pair of belts, including means for adjusting the vertical separation between said first pair of belts and said second pair of belts.

10. A dual-stream book pivot machine for turning respective first and second books each presenting a normally flat cover about an axis extending substantially perpendicular to the cover, said machine comprising:
    a receiving location for receiving the first and second books;
    a delivery location located downstream from said receiving location;
    first advancing means for advancing the first book along a first stream from the receiving location to the delivery location;
    second advancing means for advancing the second book along a second stream oriented substantially parallel and adjacent to said first stream from the receiving location to the delivery location; and
    first and second abutment means respectively positioned along said first and second streams intermediate said receiving location and said delivery location and off-center relative to each respective stream for engaging the respective books and causing the respective first and second books to pivot about said axis from a first orientation at said receiving location to a second orientation at said delivery location, said first abutment means being positioned upstream relative to said second abutment means whereby the first book advancing along the first stream is pivoted relatively prior to an adjacent book advancing along the second stream.

11. A dual-stream book pivot machine as set forth in claim 10, wherein said first and second books are received at said receiving location in side-by-side relationship and advanced to said delivery location in side-by-side relationship.

12. A dual-stream book pivot machine as set forth in claim 11, wherein each of said first and second abutment means includes an elongated rib, each of said ribs presenting an edge extending downstream for aligning a respective one of said first and second books after said books have engaged the respective abutment means.

13. A dual-stream book pivot machine as set forth in claim 11, wherein each of said first and second advancing means includes a first belt and a superposed second belt for holding the book therebetween as the book moves downstream into engagement with said abutment means and then to said delivery location.

14. A dual-stream book pivot machine as set forth in claim 11, wherein each of said advancing means includes a pair of side-by-side belts for carrying the respective book downstream into engagement with said abutment means.

15. A dual-stream book pivot machine as set forth in claim 11, including first and second holding means positioned respectively above said first and second books as said books engage said respective abutment means.

16. A dual-stream book pivot machine as set forth in claim 15, wherein each of said first and second holding means includes at least one roller.

17. A dual-stream book pivot machine as set forth in claim 11, wherein each of said first and second advancing means includes a first pair of side-by-side belts for carrying a respective one of said books and a second, superposed pair of belts for moving said respective one of said books along said stream, including means for synchronizing said first pair of belts with said second pair of belts.

18. A dual-stream book pivot machine as set forth in claim 17, said first pair of belts being separated from said second pair of belts, including means for adjusting the vertical separation between said first pair of belts and said second pair of belts.

19. A dual-stream book pivot machine for turning respective first and second books each presenting a normally flat cover about an axis extending substantially perpendicular to the cover, said machine comprising:
a receiving location for receiving the first and second books in a first common orientation;
a delivery location located downstream from said receiving location for delivering said first and second books in a second common orientation angularly displaced from said first orientation;
first advancing means for advancing the first book along a first stream from the receiving location to the delivery location;
second advancing means for advancing the second book along a second stream oriented substantially parallel and adjacent to said first stream from the receiving location to the delivery location in side-by-side relationship to the first book; and
first and second abutment means respectively positioned along said first and second streams intermediate said receiving location and said delivery location and off-center relative to each respective stream for engaging the respective books and causing the respective first and second books to pivot about said axis from said first common orientation at said receiving location to said second common orientation at said delivery location.

* * * * *